United States Patent
Huang et al.

(10) Patent No.: US 11,237,703 B2
(45) Date of Patent: Feb. 1, 2022

(54) METHOD FOR USER-OPERATION MODE SELECTION AND TERMINALS

(71) Applicant: GUANGDONG OPPO MOBILE TELECOMMUNICATIONS CORP., LTD., Guangdong (CN)

(72) Inventors: Qianyang Huang, Guangdong (CN); Lixia Duan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/928,656

(22) Filed: Jul. 14, 2020

(65) Prior Publication Data

US 2020/0341600 A1     Oct. 29, 2020

Related U.S. Application Data

(63) Continuation of application No. PCT/CN2019/080488, filed on Mar. 29, 2019.

(30) Foreign Application Priority Data

Apr. 18, 2018   (CN) .......................... 201810351170.2

(51) Int. Cl.
    *G06F 3/0482*    (2013.01)
    *G06F 3/0488*    (2013.01)

(52) U.S. Cl.
    CPC .......... *G06F 3/0482* (2013.01); *G06F 3/0488* (2013.01); *G06F 3/04883* (2013.01);
    (Continued)

(58) Field of Classification Search
    CPC .. G06F 3/0482; G06F 3/0488; G06F 3/04883; G06F 2203/04803; G06F 2203/04808
    See application file for complete search history.

(56) References Cited

U.S. PATENT DOCUMENTS 9,880,735 B2 *   1/2018  Dascola ................ G06F 40/166
2002/0076109 A1*  6/2002  Hertzfeld .............. G06F 40/284
                                                           382/229
(Continued)

FOREIGN PATENT DOCUMENTS

CN   101930341 A   12/2010
CN   102479036 A    5/2012
(Continued)

OTHER PUBLICATIONS

Cameron Summerson, "How to Change the Size of Text, Icons, and More in Android Nougat", Sep. 2, 2016, howtogeek.com, all pages (Year: 2016).*

(Continued)

*Primary Examiner* — Roberto Borja
(74) *Attorney, Agent, or Firm* — Young Basile Hanlon & MacFarlane, P.C.

(57) ABSTRACT

A method and device for page displaying, a terminal, and a storage medium are provided according to an implementation of the present disclosure. The present disclosure is related to the technical field of terminals. The method includes the following. A user configuration interface is displayed, where the user configuration interface includes a first area and a second area, and on the first area selectable operation modes are displayed. A selection operation on the first area is received, and at least one target operation mode is determined from the selectable operation modes in response to the selection operation. Information associated with the at least one target operation mode is displayed on the second area.

17 Claims, 12 Drawing Sheets

(52) U.S. Cl.
CPC .............. *G06F 2203/04803* (2013.01); *G06F 2203/04808* (2013.01)

(56) References Cited

U.S. PATENT DOCUMENTS

| | | | |
|---|---|---|---|
| 2011/0248948 A1 | 10/2011 | Griffin et al. | |
| 2014/0372904 A1 | 12/2014 | Liu et al. | |
| 2015/0062046 A1* | 3/2015 | Cho | G06F 3/0412 345/173 |
| 2015/0339524 A1* | 11/2015 | Yang | G06F 3/04883 382/189 |
| 2016/0092047 A1* | 3/2016 | Yoon | G06F 3/0236 715/798 |
| 2017/0168782 A1* | 6/2017 | Boyd | G06F 3/0481 |

FOREIGN PATENT DOCUMENTS

| | | |
|---|---|---|
| CN | 102566818 A | 7/2012 |
| CN | 102945243 A | 2/2013 |
| CN | 103440087 A | 12/2013 |
| CN | 105677223 A | 6/2016 |
| CN | 105843516 A | 8/2016 |
| CN | 106406892 A | 2/2017 |
| CN | 106775185 A | 5/2017 |
| CN | 107608558 A | 1/2018 |
| CN | 107621918 A | 1/2018 |
| CN | 108427701 A | 8/2018 |
| EP | 2843535 A2 | 3/2015 |
| EP | 2933718 A1 | 10/2015 |

OTHER PUBLICATIONS

International search report issued in corresponding international application No. PCT/CN2019/080488 dated Jul. 2, 2019.
Enlglish Translation The first OA issued in corresponding CN application No. 201810351170.2 dated Apr. 17, 2019.
Extended European Search Report for EP Application 19788598.1 dated May 7, 2021. (8 pages).
First Examination report issued in corresponding IN application No. 202017035/19 dated Aug. 27, 2021.

\* cited by examiner

METHOD FOR USER-OPERATION MODE SELECTION AND TERMINALS

CROSS-REFERENCE TO RELATED APPLICATION(S)

This application is a continuation of International Application No. PCT/CN2019/080488, filed on Mar. 29, 2019, which claims priority to Chinese Patent Application Serial No. 201810351170.2, filed on Apr. 18, 2018, the entire disclosures of both of which are hereby incorporated by reference.

TECHNICAL FIELD

This disclosure relates to the technical field of terminals, and in particular, to a method for page displaying and terminals.

BACKGROUND

With the development of science and technology, terminals have become one of the most commonly used electronic products in people's daily lives. Moreover, with emergence and popularization of pressure sensing technology, more and more terminals employ pressure sensing technology to increase a speed of information acquisition.

SUMMARY

A method for page displaying and terminals are provided according to the present disclosure.

In a first aspect, a method for page displaying is provided according to an implementation of the present disclosure. The method includes the following. A user configuration interface is displayed, where the user configuration interface includes a first area and a second area, and on the first area selectable operation modes are displayed. A selection operation on the first area is received, and at least one target operation mode is determined from the selectable operation modes in response to the selection operation. Information associated with the at least one target operation mode is displayed on the second area.

In a second aspect, a terminal is provided according to an implementation of the present disclosure. The terminal includes a processor and a memory configured to store one or more programs. The one or more programs, when executed, are operable with the processor to perform the method described in the first aspect.

In a third aspect, a terminal is provided according to an implementation of the present disclosure. The terminal includes a processor and a memory configured to store one or more programs. The one or more programs, when executed, are operable with the processor to display, in response to user input, multiple selectable operation modes on the terminal, select, in response to an operation on the terminal, at least one of the selectable operation modes as at least one target operation mode, and display the at least one target operation mode and information associated with the at least one target operation mode simultaneously.

BRIEF DESCRIPTION OF THE DRAWINGS

To describe technical solutions in the implementations of the present disclosure more clearly, the following will briefly introduce the accompanying drawings required for describing the implementations. Apparently, the accompanying drawings in the following description merely illustrate some implementations of the present disclosure. Those of ordinary skill in the art may also obtain other accompanying drawings based on these accompanying drawings without creative efforts.

DETAILED DESCRIPTION

The technical solutions in implementations of the present disclosure will be clearly and completely illustrated in the following with reference to the accompanying drawings in the implementations of the present disclosure. Apparently, the described implementations are merely a part of rather than all the implementations of the present disclosure. All other implementations obtained by those of ordinary skill in the art based on the implementations of the present disclosure without creative efforts are within the scope of the present disclosure.

At present, when a user chats online, reads text, views pictures, or watches videos through a terminal, he/she may be often interested in some content and search for more detailed information. At this point, the user first needs to copy the content of interest or keep the content of interest in mind, then opens the browser and pastes the copied content into a search box of the browser or enters the remembered content into the search box of the browser to search for detailed information. This operation is relatively cumbersome, takes a long time, and is prone to errors.

Further, in order to solve the problem of the tedious search process, more and more terminal manufacturers employ pressure sensing technology to recognize text and extract a keyword, and then a search can be performed with the keyword, such that a search through the browser can be avoided, thereby increasing a speed of information acquisition. However, after long-term research, the inventor found that the current pressure sensing mode used in terminals is fixed and single, and is not suitable for all users. Therefore, the problem of false touch or wrong recognition often occurs, resulting in low user experience. To solve the above technical problems, the inventor proposes a method and device for page displaying, a terminal, and a storage medium provided in the implementations of the present disclosure, so as to provide different operation modes for a user to make a selection, thereby facilitating user operations and improving user experience. The method for page displaying will be described in detail in subsequent implementations.

Figure 1:
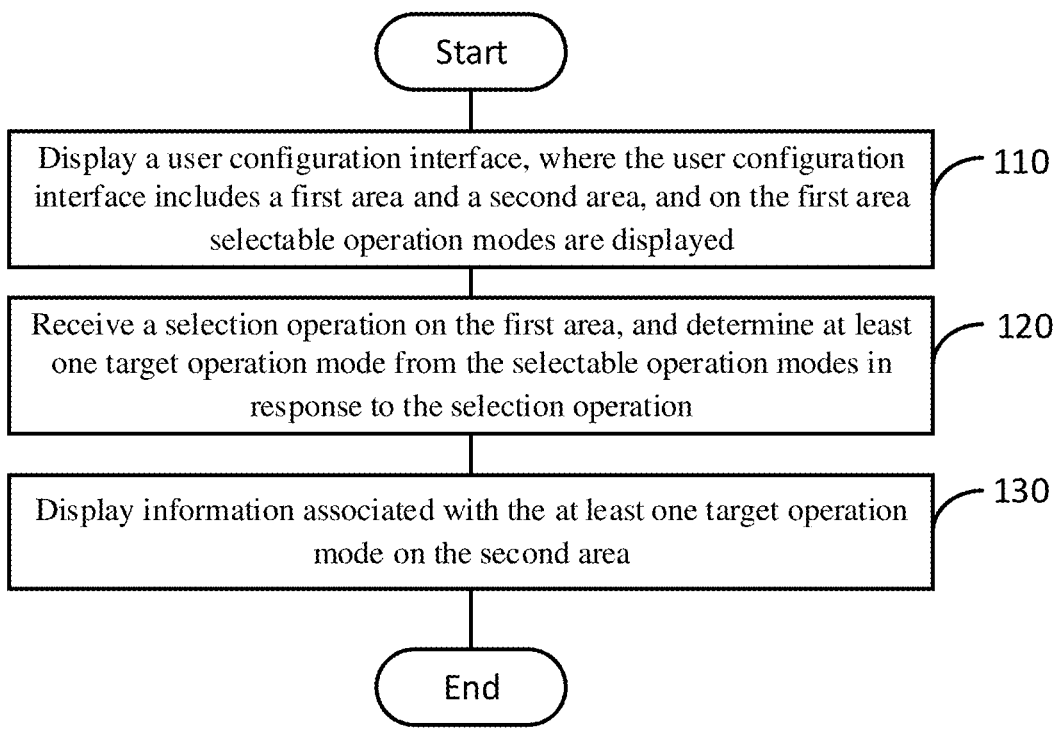
FIG. 1 is a schematic flow chart illustrating a method for page displaying according to an implementation of the present disclosure.
Figure 11:
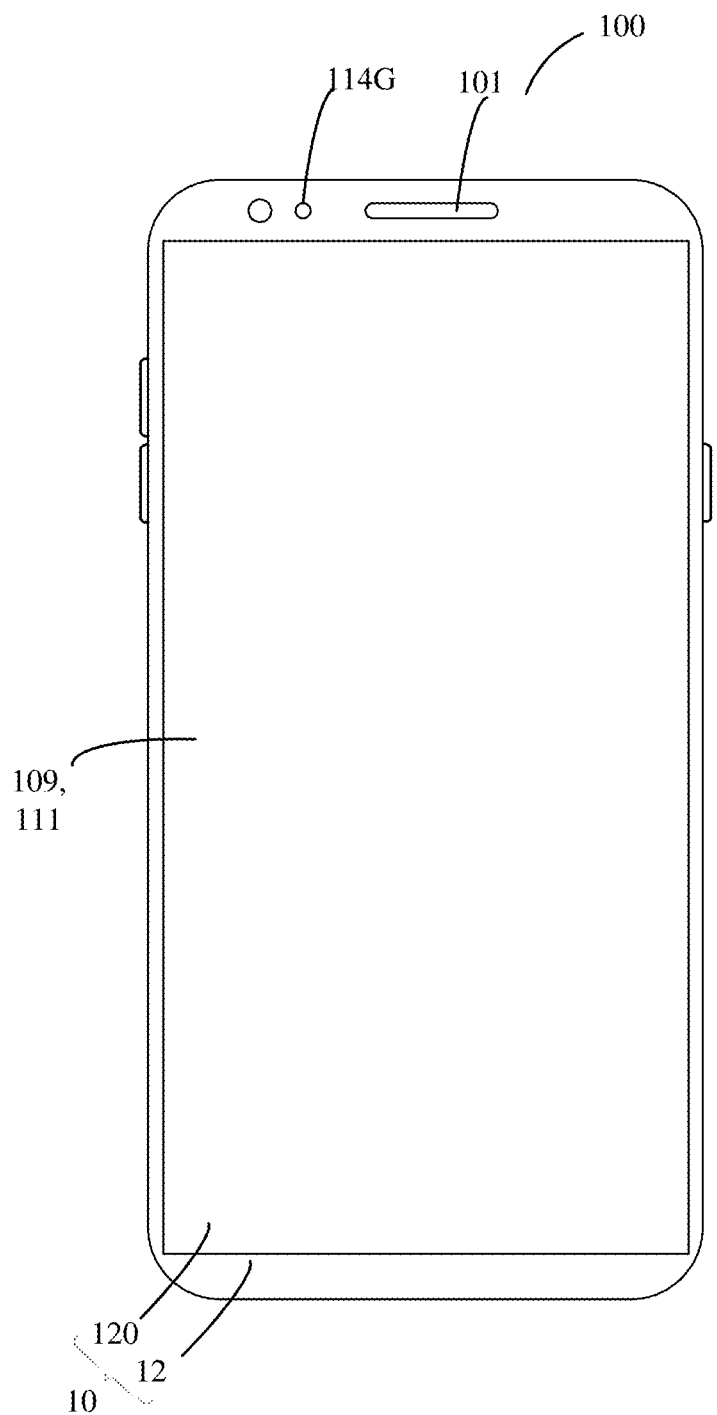
FIG. 11 is a schematic structural view illustrating a terminal according to an implementation of the present disclosure.

FIG. 1 is a schematic flow chart illustrating a method for page displaying according to an implementation of the present disclosure. The method for page displaying is used for providing different operation modes for a user to make a selection, thereby facilitating user operations and improving user experience. In an implementation, the method for page displaying is applied to a device 200 for page displaying illustrated in FIG. 9 and a terminal configured with the device 200 for page displaying (see FIG. 11). The following takes a terminal as an example to describe the detailed process of this implementation. Of course, it can be understood that the terminal involved in this implementation may be a smart phone, a tablet computer, a wearable electronic device, or the like, which is not limited herein. The process illustrated in FIG. 1 will be described in detail below. The method for page displaying includes the following.

At block 110, a user configuration interface is displayed. The user configuration interface includes a first area and a second area, and on the first area multiple selectable operation modes are displayed.

In this implementation, when a user wants to open the user configuration interface of the terminal, an instruction needs to be first sent to the terminal, so as to direct the terminal to open and display the user configuration interface. The instruction may be generated in response to a touch operation on an application configuration icon displayed on an interface of the terminal, or may be generated in response to a voice command for displaying the user configuration interface input through the terminal, which is not limited herein.

The first area may be above the second area, or may be below the second area, or may be on the left of the second area, or may be on the right of the second area. Alternatively, the first area may surround the second area. In the implementation, the first area is above the second area. Furthermore, the first area may be larger than the second area, or equal the second area in size, or smaller than the second area. In the implementation, the first area is smaller than the second area. Certainly, for the first area and the second area, there are other position relationships and size relationships, which are not exhaustively illustrated herein.

In addition, when the terminal displays the user configuration interface, on the first area multiple selectable operation modes may be displayed. The selectable operation modes may include large area pressing, continuous long pressing, continuous super long pressing, two-fingers long pressing, after copying, multi-finger continuous clicking, etc. The large area pressing refers to that a pressing area exceeds a preset area. The continuous long pressing refers to that duration of continuous pressing exceeds preset duration. The continuous super long pressing refers to that duration of pressing exceeds preset super duration. The two-finger long pressing refers to that two fingers perform pressing simultaneously and duration of pressing with the two fingers exceeds predetermined duration. The after copying refers to that content is copied to the pasteboard. The multi-finger continuous clicking refers to that the number of consecutive clicks exceeds preset number of times. In an implementation, at this point, the second area is blank, or other information may be displayed on the second area, such as introduction information of one selectable operation mode or introduction information of a function, etc., which is not limited herein.

At block 120, a selection operation on the first area is received, and at least one target operation mode is determined from the multiple selectable operation modes in response to the selection operation.

It is to be understood that one or more of the multiple selectable operation modes displayed on the user configuration interface can be selected. For example, one or more of the large area pressing, the continuous long pressing, the continuous super long pressing, the two-fingers long pressing, the after copying, and the multi-finger continuous clicking can be selected as one or more target operation modes. In the implementation, the number of the at least one target operation mode can be set according to user requirements and is recorded as a preset number. For example, the number of the at least one target operation mode may be 1, 2, or 3. When the number of the at least one target operation mode is 2, two of the multiple selectable operation modes can be selected as the target operation modes. In the implementation, selecting one target operation mode is taken as an example for illustration.

In addition, when performing operation mode selection, an instruction is first sent to the terminal to inform the terminal of a selected operation mode. The instruction may be generated in response to a touch operation on one of the multiple selectable operation modes displayed on the first area, or may be generated in response to a voice command containing a selected operation mode input through the terminal. Alternatively, in the implementation, operation mode selection can be performed via clicking. In response to user selection, the terminal determines one of the multiple selectable operation modes as the target operation mode.

At block 130, information associated with the at least one target operation mode is displayed on the second area.

In the implementation, when the at least one target operation mode is determined, the information associated with the at least one target operation mode is obtained and displayed on the second area. It is to be understood that each of the selectable operation modes has associated information that may be displayed on the second area. The information associated with the selectable operation modes that may be displayed on the second area may be the same or different from each other, which is not limited herein. As an example, the information associated with one target operation mode may be detailed introduction information of the target operation mode, or may be detailed configuration information of the target operation mode or authority selection information of the target operation mode, such that further configuration of the target operation mode can be realized.

Furthermore, after determining the at least one target operation mode, among the multiple selectable operation modes displayed on the first area, the at least one target operation mode is highlighted. Among the multiple selectable operation modes, the at least one target operation mode can be checked, or the at least one target operation mode can be darkened, or other of the multiple selectable operation modes other than the at least one target operation mode can be hidden, such that the user can intuitively determine the operation mode associated with the information displayed on the second area.

For the method for page displaying in the implementation of the present disclosure, the user configuration interface is displayed. The user configuration interface includes the first area and the second area. On the first area the multiple selectable operation modes are displayed. The selection operation on the first area is received, the at least one target operation mode is determined from the multiple selectable operation modes in response to the selection operation, and the information associated with the at least one target operation mode is displayed on the second area. Thus, different operation modes can be provided for user selection, thereby facilitating user operation and improving user experience.

Figure 2:
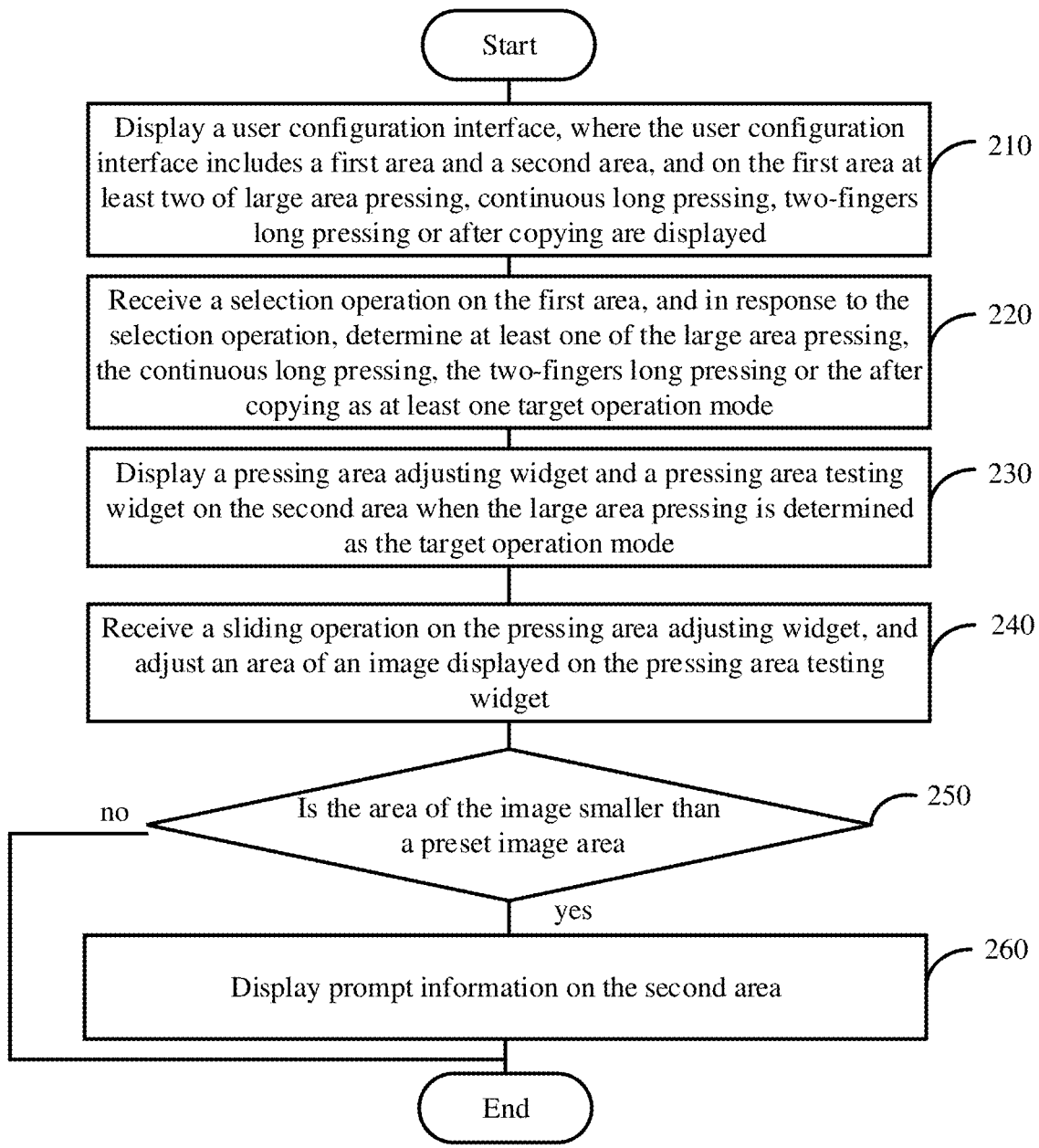
FIG. 2 is a schematic flow chart illustrating a method for page displaying according to another implementation of the present disclosure.

FIG. 2 is a schematic flow chart illustrating a method for page displaying according to another implementation of the present disclosure. The following will illustrate the process illustrated in FIG. 2 in detail. The method may include the following.

At block 210, a user configuration interface is displayed. The user configuration interface includes a first area and a second area, and on the first area at least two of large area pressing, continuous long pressing, two-fingers long pressing or after copying are displayed.

In the implementation, on the first area at least two of the large area pressing, the continuous long pressing, the two-fingers long pressing or the after copying are displayed. For example, on the first area the large area pressing and the continuous long pressing are displayed, or the large area pressing and the after copying are displayed, or the continuous long pressing and the two-fingers long pressing are displayed, or the two-fingers long pressing and the after copying are displayed, or the large area pressing, the continuous long pressing and the two-fingers long pressing are displayed, or the large area pressing, the continuous long pressing, the two-fingers long pressing and the after copying are displayed. Thus, multiple selectable operation modes can be provided for user selection, thereby conforming to user's usage habits and improving user experience.

At block 220, a selection operation on the first area is received, and in response to the selection operation, at least one of the large area pressing, the continuous long pressing, the two-fingers long pressing or the after copying is determined as at least one target operation mode.

When on the first area at least two of the large area pressing, the continuous long pressing, the two-fingers long pressing or the after copying are displayed, a touch operation on the first area can be detected, and upon detecting the selection operation on the first area, at least one of the large area pressing, the continuous long pressing, the two-fingers long pressing or the after copying is determined as the at least one target operation mode according to the selection operation.

At block 230, when the large area pressing is determined as the target operation mode, a pressing area adjusting widget and a pressing area testing widget are displayed on the second area.

Figure 3:
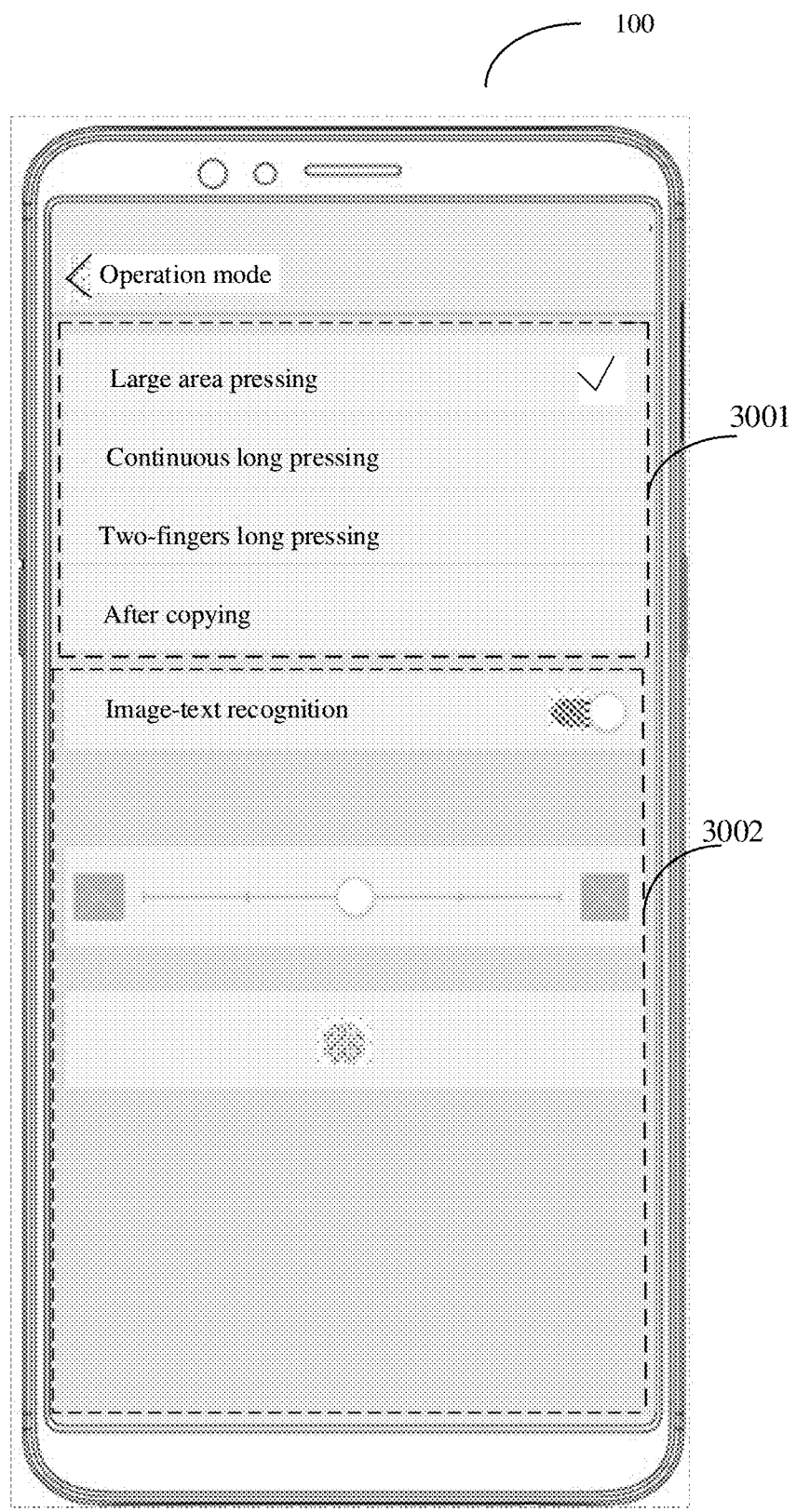
FIG. 3 is a schematic view illustrating a first interface of a terminal provided by the implementation of the present disclosure illustrated in FIG. 2.

FIG. 3 is a schematic diagram illustrating a first interface of a terminal provided by the implementation illustrated in FIG. 2. When the large area pressing displayed in the first area (i.e., the area 3001 illustrated I FIG. 3) is determined as the target operation mode, information associated with the large area pressing is displayed on the second area (i.e., the area 3002 illustrated in FIG. 3). As an example, the information displayed on the second area may include the pressing area adjusting widget and the pressing area testing widget. The pressing area adjusting widget is configured for adjusting a pressing area in response to a touch operation. The pressing area testing widget is configured for providing feedback for the touch operation performed on the pressing area adjusting widget.

Furthermore, in the implementation, when the large area pressing is determined as the target operation mode, on the second area an image-text recognition selecting widget, the pressing area adjusting widget, and the pressing area testing widget are all displayed. The image-text recognition selecting widget, the pressing area adjusting widget, and the pressing area testing widget may be sequentially displayed from top to bottom or from bottom to top, which is not limited herein. The image-text recognition selecting widget is configured for enabling or disabling an image recognition function in response to user selection. In the implementation, the image-text recognition selecting widget is switched on by default, and under this condition it indicates that the large area pressing can be used for recognizing text or images. When the image-text recognition selecting widget is switched off, it indicates that the large area pressing can be merely used for text recognition.

At block 240, a sliding operation on the pressing area adjusting widget is received, and an area of an image displayed on the pressing area testing widget is adjusted.

In an implementation, the pressing area adjusting widget includes a slider that can slide from right to left or from left to right. The slider slides from right to left or from left to right in response to a sliding operation on the pressing area adjusting widget. It is to be understood that by dragging the slider from right to left or from left to right, the pressing area can be adjusted. As an example, the slider of the pressing area adjusting widget has five positions indicative of different areas from left to right, i.e., a position indicative of a minimum area, a position indicative of a small area, a position indicative of a medium area, a position indicative of a large area, and a position indicative of a maximum area. By sliding the slider to different positions, the pressing area can be adjusted.

In an implementation, on the pressing area testing widget a text and an image overlay on the text are displayed. The text is used for performing a pressing area test. The image is enlarged or reduced with slide of the slider from left to right or from right to left. When the slider slides to left, the image is accordingly reduced, and when the slider slides to right, the image is accordingly enlarged, thereby providing intuitive pressing area adjustment to facilitate user configuration.

At block 250, whether an area of the image is smaller than a preset image area is determined.

In the implementation, the preset image area is set and stored in the terminal in advance. The preset image area acts as a determination basis for the area of the image. Furthermore, during sliding the slider of the pressing area adjusting widget, the area of the image of the pressing area testing widget is obtained, and the area of the image is compared with the preset image area to determine whether the area of the image is smaller than the preset image area. It is to be understood that when the area of the image is not smaller than the preset image area, it indicates that the pressing area set is within a reasonable range, and quick and convenient recognition can be achieved. When the area of the image is smaller than the preset image area, it indicates that the pressing area set is out of the reasonable range, and thus recognition is not easy and errors are easily generated.

At block 260, when the area of the image is smaller than the preset image area, prompt information is displayed on the second area.

Figure 4:
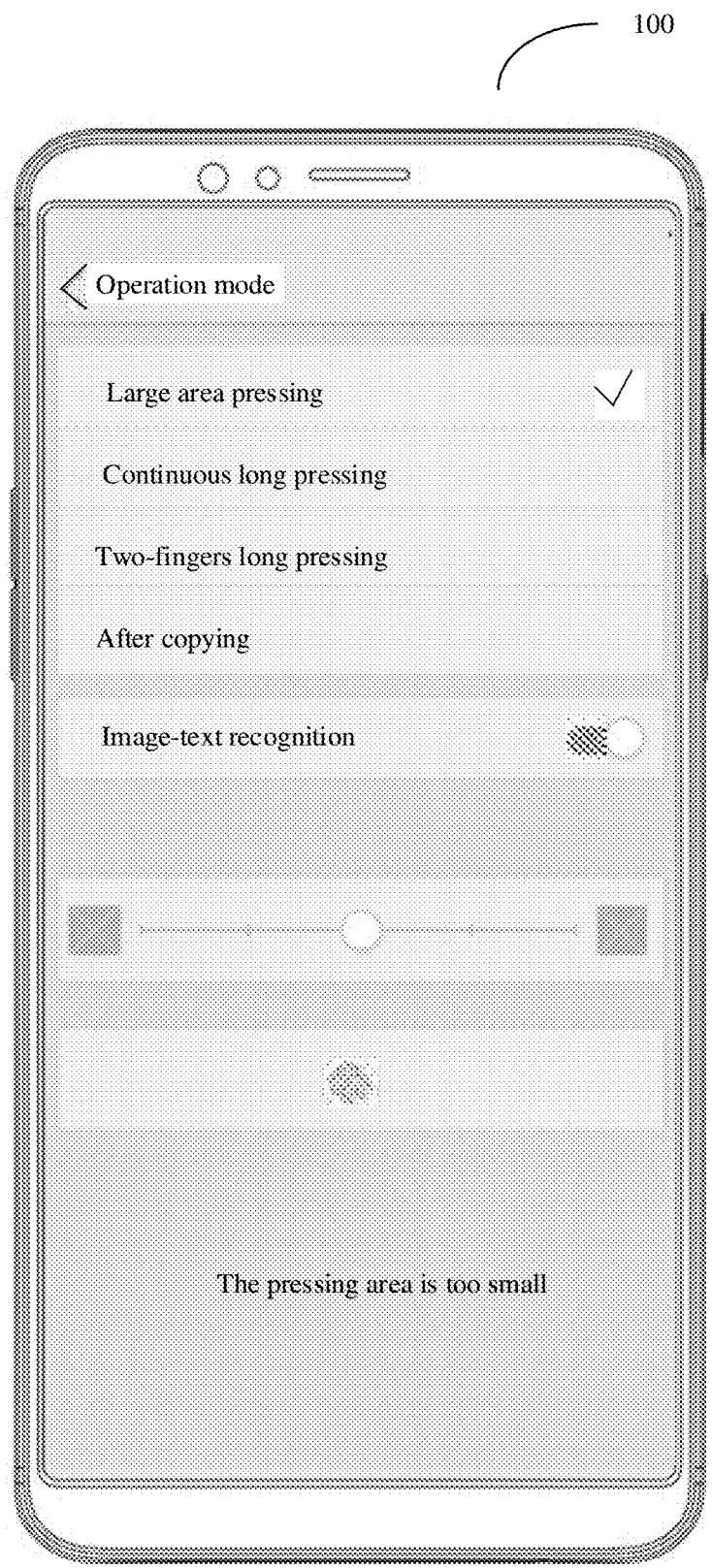
FIG. 4 is a schematic view illustrating a second interface of the terminal provided by the implementation of the present disclosure illustrated in FIG. 2.

FIG. 4 is a schematic view illustrating a second interface of the terminal provided by the implementation illustrated in FIG. 2. In this implementation, when the area of the image is smaller than the preset image area, the prompt information is correspondingly displayed on the second area to prompt the user that the current pressing area is too small, such that recognition is not easy and errors are easily generated. The prompt information may be a text, such as "the pressing area is too small", voice prompt information, vibration prompt information, or other.

For the method for page displaying provided in the implementation of the present disclosure, the user configuration interface is displayed. The user configuration interface includes the first area and the second area. On the first area at least two of the large area pressing, the continuous long pressing, the two-fingers long pressing or the after copying are displayed. The selection operation on the first area is received, and in response to the selection operation, at least one of the large area pressing, the continuous long pressing, the two-fingers long pressing or the after copying is determined as the at least one target operation mode. When the large area pressing is determined as the target operation mode, the pressing area adjusting widget and the pressing area testing widget are displayed on the second area. When the sliding operation on the pressing area adjusting widget is received, the area of the image displayed on the pressing area testing widget is adjusted based on the sliding operation. Whether the area of the image is smaller than the preset image area is determined. When the area of the image is smaller than the preset image area, the prompt information is displayed on the second area. In the implementation, the large area pressing, the continuous long pressing, the two-fingers long pressing, and the after copying are provided for user selection, thereby facilitating user operation and improving user experience.

Figure 5:
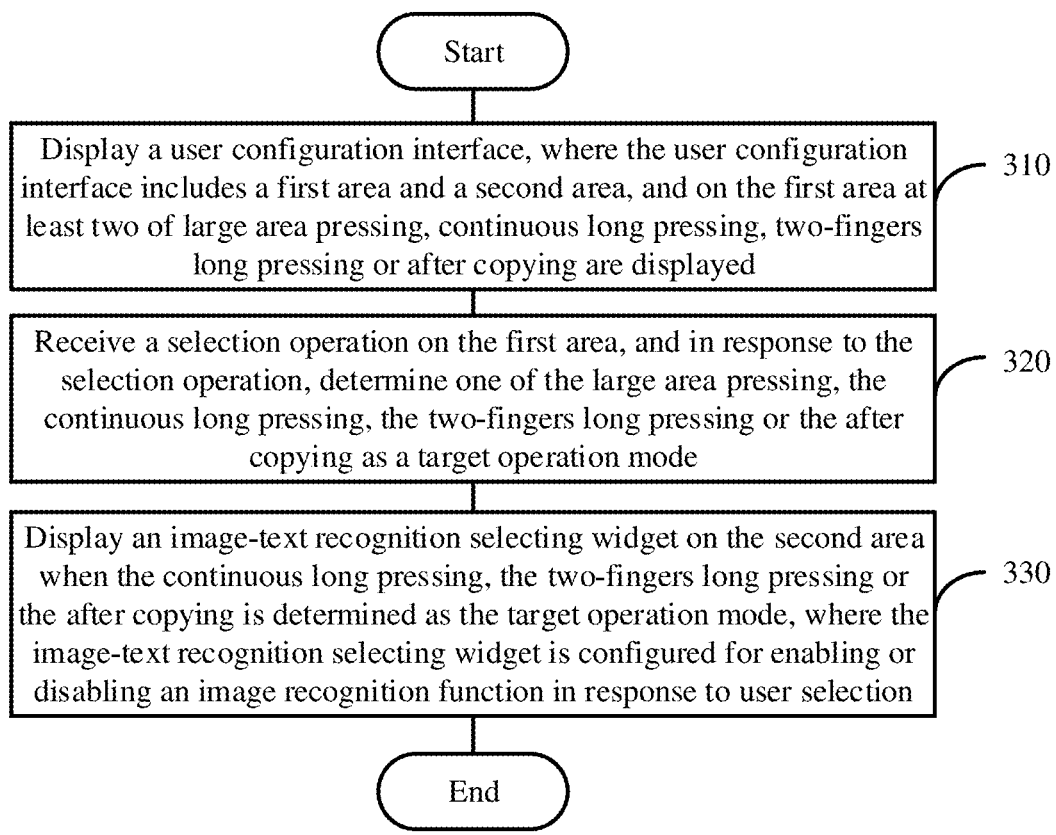
FIG. 5 is a schematic flow chart illustrating a method for page displaying according to yet another implementation of the present disclosure.

FIG. 5 is a schematic flow chart illustrating a method for page displaying according to yet another implementation of the present disclosure. The following will illustrate the process illustrated in FIG. 5 in detail. The method may include the following.

At block 310, a user configuration interface is displayed. The user configuration interface includes a first area and a second area, and on the first area at least two of large area pressing, continuous long pressing, two-fingers long pressing or after copying are displayed.

At bock 320, a selection operation on the first area is received, and in response to the selection operation, one of the large area pressing, the continuous long pressing, the two-fingers long pressing or the after copying is determined as a target operation mode.

At block 330, when the continuous long pressing, the two-fingers long pressing or the after copying is determined as the target operation mode, an image-text recognition selecting widget is displayed on the second area. The image-text recognition selecting widget is configured for enabling or disabling an image recognition function in response to user selection.

Figure 6:
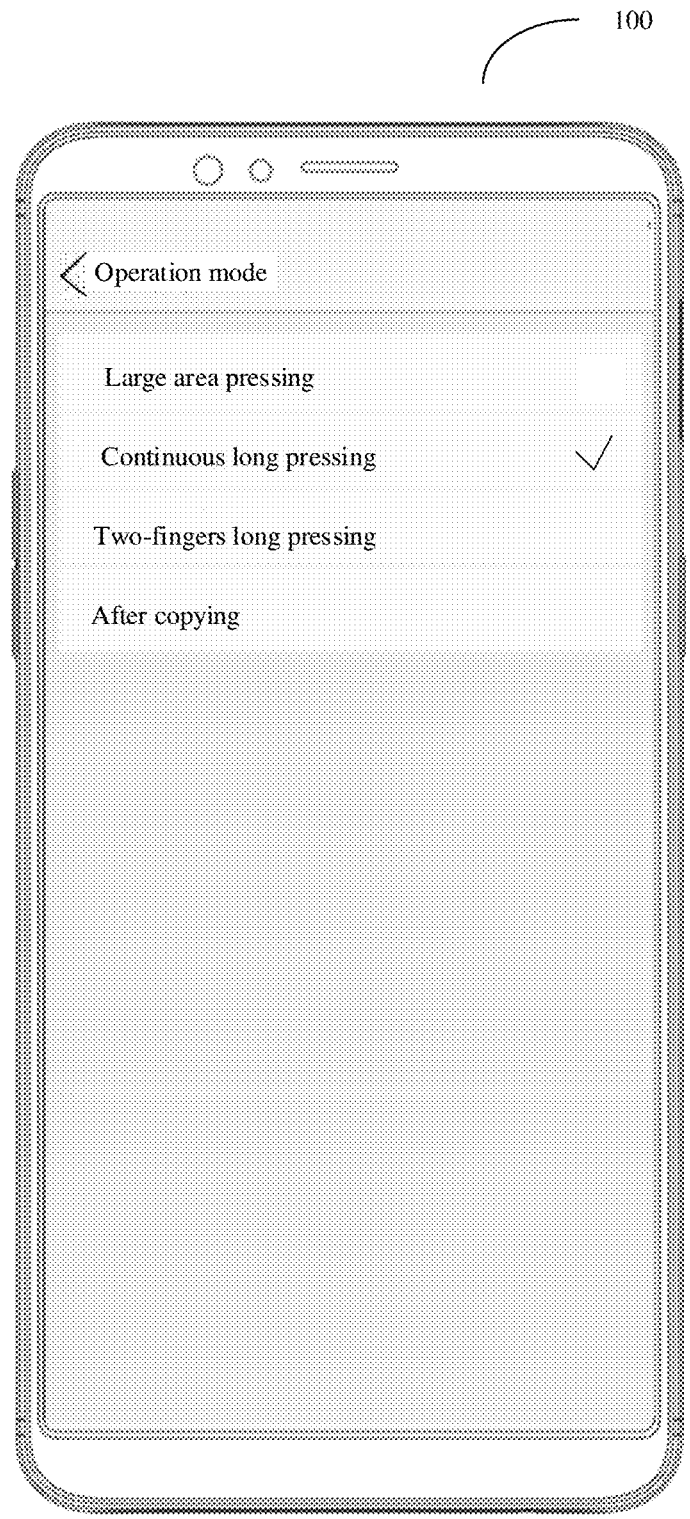
FIG. 6 is a schematic view illustrating a first interface of a terminal provided by the implementation of the present disclosure illustrated in FIG. 3.
Figure 7:
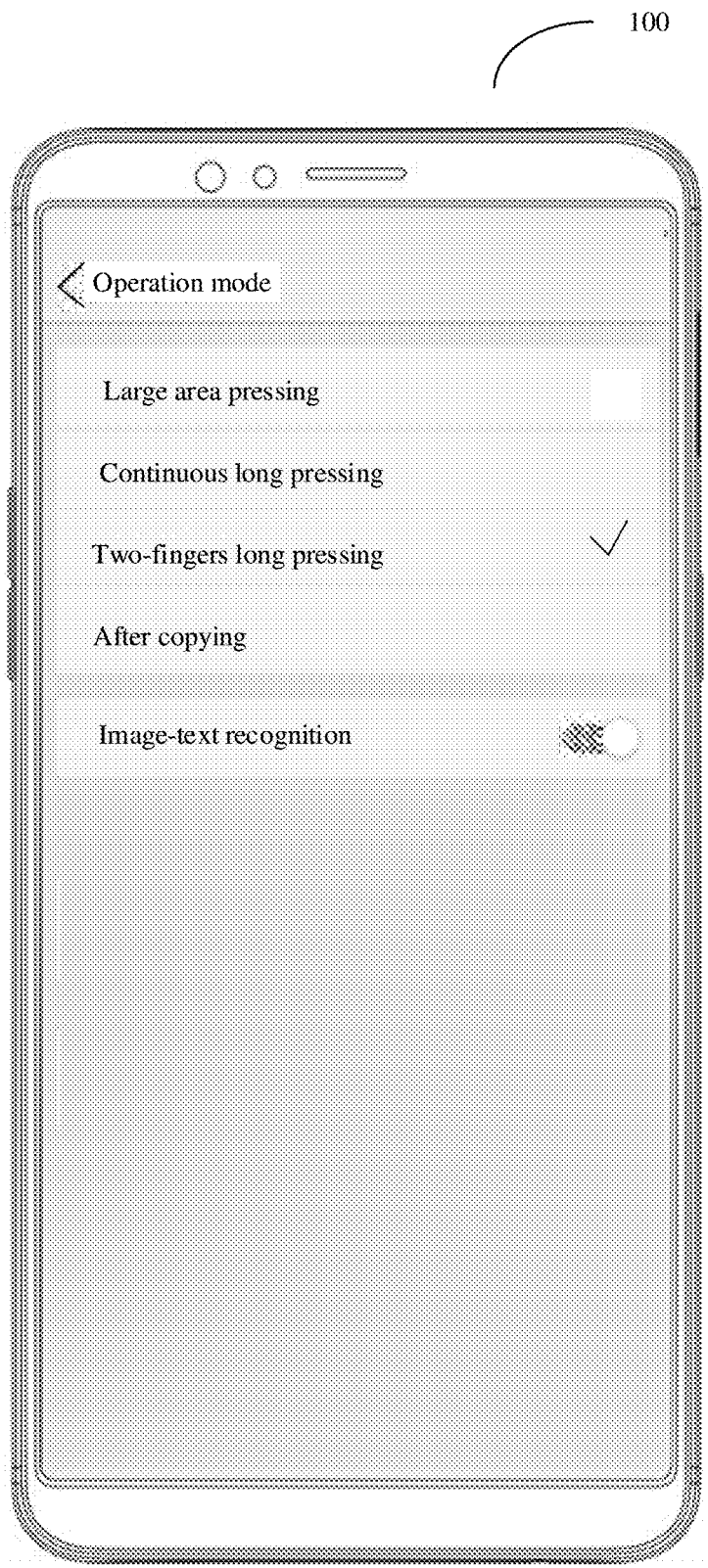
FIG. 7 is a schematic view illustrating a second interface of the terminal provided by the implementation of the present disclosure illustrated in FIG. 3.
Figure 8:
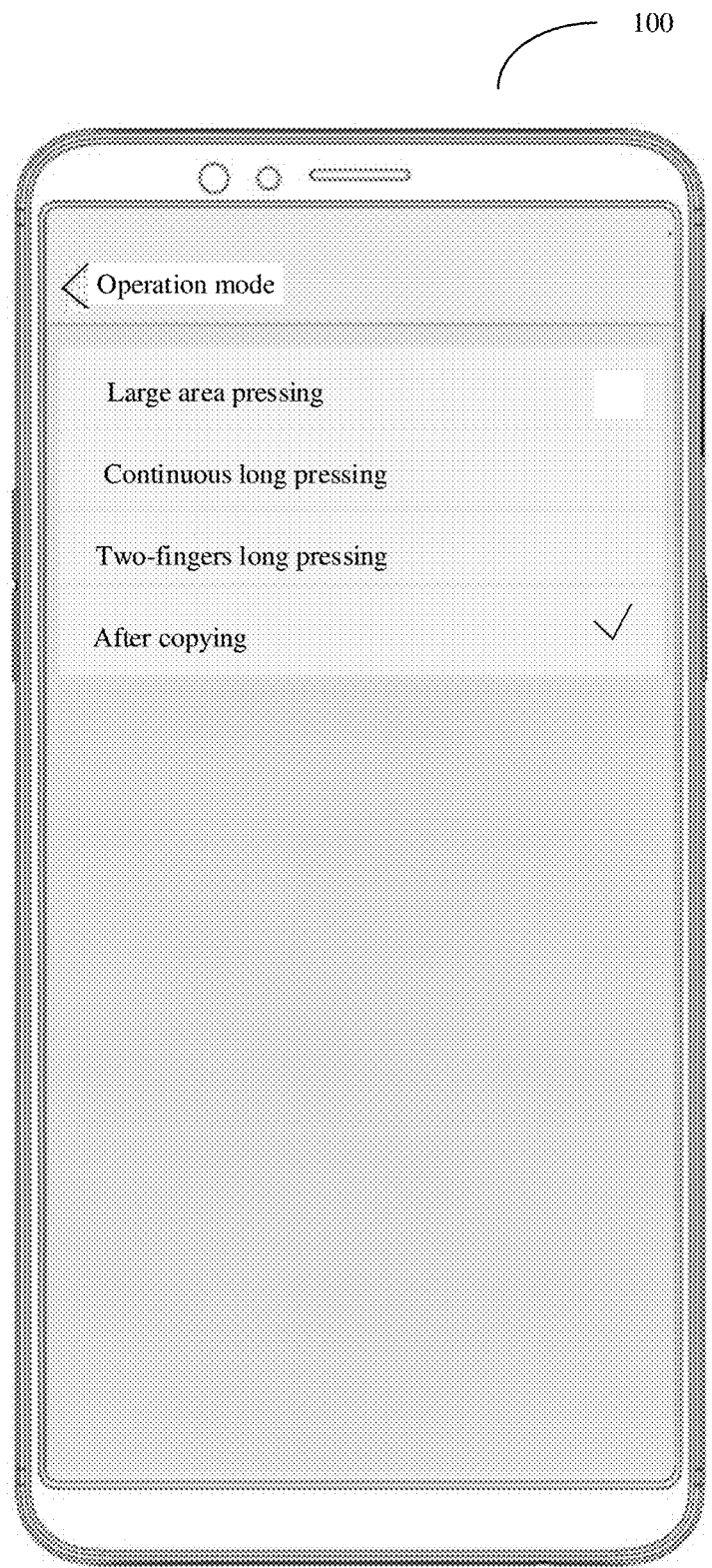
FIG. 8 is a schematic view illustrating a third interface of the terminal provided by the implementation of the present disclosure illustrated in FIG. 3.

In the implementation, when the continuous long pressing, the two-fingers long pressing, or the after copying is determined as the target operation mode, information associated with the target operation mode is displayed on the second area. FIG. 6 is a schematic view illustrating a first interface of the terminal provided by the implementation illustrated in FIG. 5. When the continuous long pressing is determined as the target operation mode, information associated with the continuous long pressing is displayed on the second area. At this point, the second area is blank. FIG. 7 is a schematic view illustrating a second interface of the terminal provided by the implementation illustrated in FIG. 5. When the two-fingers long pressing is determined as the target operation mode, information associated with the two-fingers long pressing is displayed on the second area. At this point, on the second area the image-text recognition selecting widget is displayed. FIG. 8 is a schematic view illustrating a third interface of the terminal provided by the implementation illustrated in FIG. 5. When the after copying is determined as the target operation mode, information associated with the after copying is displayed on the second area. At this point, the second area is blank.

In another example, when any of the continuous long pressing, the two-fingers long pressing, or the after copying is determined as the target operation mode, the image-text recognition selecting widget is displayed on the second area. The image-text recognition selecting widget is configured for enabling or disabling the image recognition function in response to user selection. In the implementation, the image-text recognition selecting widget is switched on by default, and under this condition it indicates that the continuous long pressing, the two-fingers long pressing or the after copying can be used for text recognition or image recognition. When the image-text recognition selecting widget is switched off, it indicates that the large area pressing is merely used for text recognition.

For the method for page displaying provided in the implementation of the present disclosure, the user configuration interface is displayed. The user configuration interface includes the first area and the second area. On the first area at least two of the large area pressing, the continuous long pressing, the two-fingers long pressing or the after copying are displayed. The selection operation on the first area is received, and in response to the selection operation, one of the large area pressing, the continuous long pressing, the two-fingers long pressing, or the after copying is determined as the target operation mode. When the continuous long pressing, the two-fingers long pressing or the after copying is determined as the target operation mode, the image-text recognition selecting widget is displayed on the second area. The image-text recognition selecting widget is configured for enabling or disabling the image recognition function in response to user selection. In the implementation, the large area pressing, the continuous long pressing, the two-fingers long pressing, and the after copying are provided for user selection, thereby facilitating user operation and improving user experience.

Figure 9:
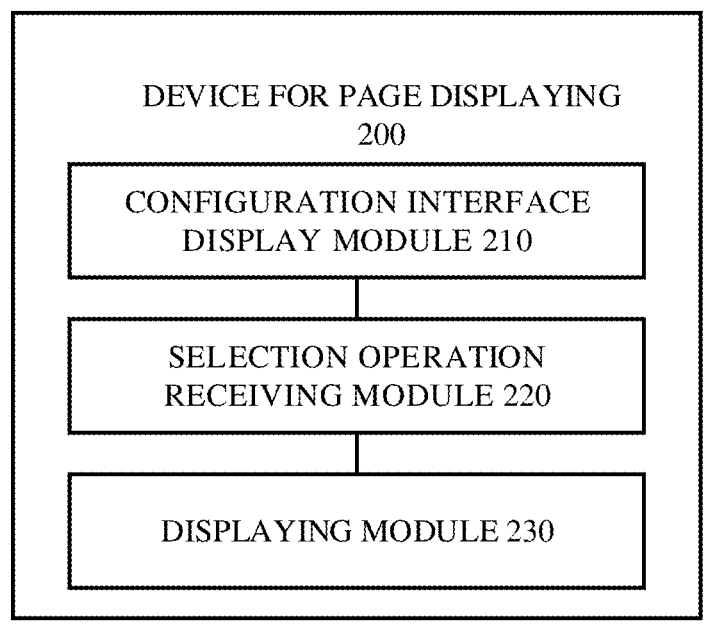
FIG. 9 is a first block diagram illustrating a device for page displaying according to an implementation of the present disclosure.

FIG. 9 is a block diagram illustrating a device 200 for page displaying according to an implementation of the present disclosure. The following is described with reference to FIG. 9. The device 200 for page displaying includes a configuration interface display module 210, a selection operation receiving module 220, and a displaying module 230.

The configuration interface display module 210 is configured to display a user configuration interface, where the user configuration interface includes a first area and a second area, and on the first area multiple selectable operation modes are displayed.

Figure 10:
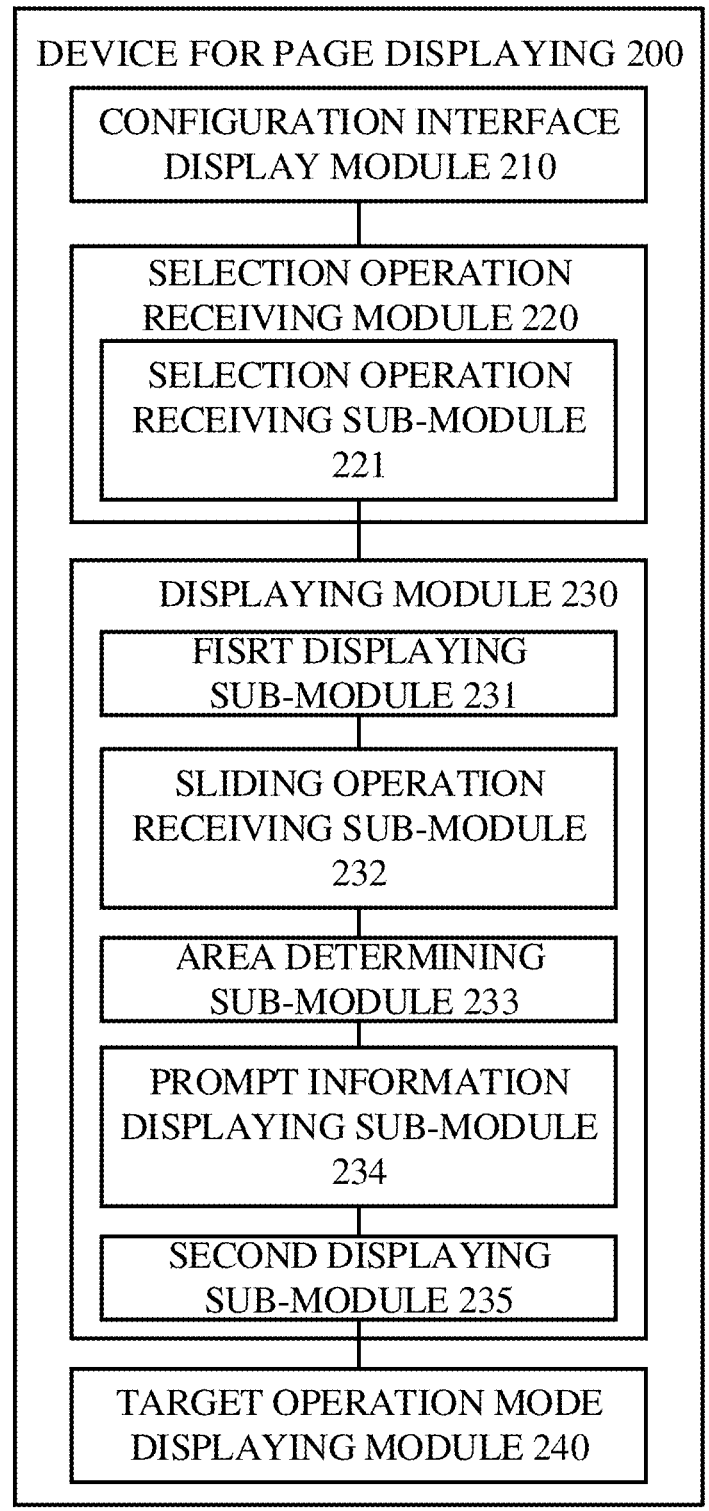
FIG. 10 is a second block diagram illustrating a device for page displaying according to another implementation of the present disclosure.

The selection operation receiving module 220 is configured to receive a selection operation on the first area, and determine at least one target operation mode from the multiple selectable operations modes in response to the selection operation. FIG. 10 is a block diagram illustrating the device 200 for page displaying according to another implementation of the present disclosure. Furthermore, the selection operation receiving module 220 includes a selection operation receiving sub-module 221.

The selection operation receiving sub-module 221 is configured to receive the selection operation on the first area, and determine at least one of large area pressing, continuous long pressing, two-fingers long pressing, or after copying as the at least one target operation mode.

The displaying module 230 is configured to display information associated with the at least one target operation mode on the second area. Furthermore, the displaying module 230 includes a first displaying sub-module 231, a sliding operation receiving sub-module 232, an area determining sub-module 233, a prompt information displaying sub-module 234, and a second displaying sub-module 235.

The first displaying sub-module 231 is configured to display a pressing area adjusting widget and a pressing area testing widget on the second area. Furthermore, the displaying sub-module 231 includes a displaying unit.

The displaying unit is configured to display an image-text recognition selecting widget, a pressing area adjusting widget, and a pressing area testing widget on the second area, where the image-text recognition selecting widget is configured for enabling or disabling an image recognition function in response to user selection.

The sliding operation receiving sub-module 232 is configured to receive a sliding operation on the pressing area adjusting widget, and adjust an area of an image displayed on the pressing area testing widget in response to the sliding operation.

The area determining sub-module 233 is configured to determine whether the area of the image is smaller than a preset image area.

The prompt information displaying sub-module 234 is configured to display prompt information on the second area when the area of the image is smaller than the preset image area.

The second displaying sub-module 235 is configured to display the image-text recognition selecting widget on the second area, where the image-text recognition selecting widget is configured for enabling or disabling the image recognition function in response to user selection.

Furthermore, the device 200 for page displaying further includes a target operation mode displaying module 240 configured to highlight the at least one target operation mode among the multiple selectable operation modes.

As described above, the method and device for page displaying, a terminal, and a storage medium are provided according to an implementation of the present disclosure. The user configuration interface is displayed. The user configuration interface includes the first area and the second area. On the first area the multiple selectable operation modes are displayed. The selection operation on the first area is received, the at least one target operation mode is determined from the multiple selectable operation modes in response to the selection operation, and the information associated with the at least one target operation mode is displayed on the second area. Thus, different operation modes can be provided for user selection, thereby facilitating user operation and improving user experience.

It should be noted that the implementations in this specification are described in a progressive manner. Each implementation focuses on these different from other implementations. For the same and similar parts of the implementations, reference can be made to each other. For the device implementation, since it is substantially the same as the method implementation, the description of the device implementation is relatively simple, and for description of related part, reference can be made to the related description of the method implementation. Any processing method described in the method implementation can be implemented by a corresponding processing module in the device implementation, and details are not repeated in the device implementation.

Referring to FIG. 11 again, based on the above-mentioned method and device for page displaying, an implementation of the present disclosure further provides a terminal 100. The terminal 100 includes an electronic body 10. The electronic body 10 includes a housing 12 and a main display 120 disposed on the housing 12. The housing 12 may be made of metal such as steel or aluminum alloy. In this implementation, the main display screen 120 generally includes a display panel 111, and may also include a circuit for responding to a touch operation on the display panel 111. The display panel 111 may be a liquid crystal display (LCD). In some implementations, the display panel 111 is also a touch screen 109.

Figure 12:
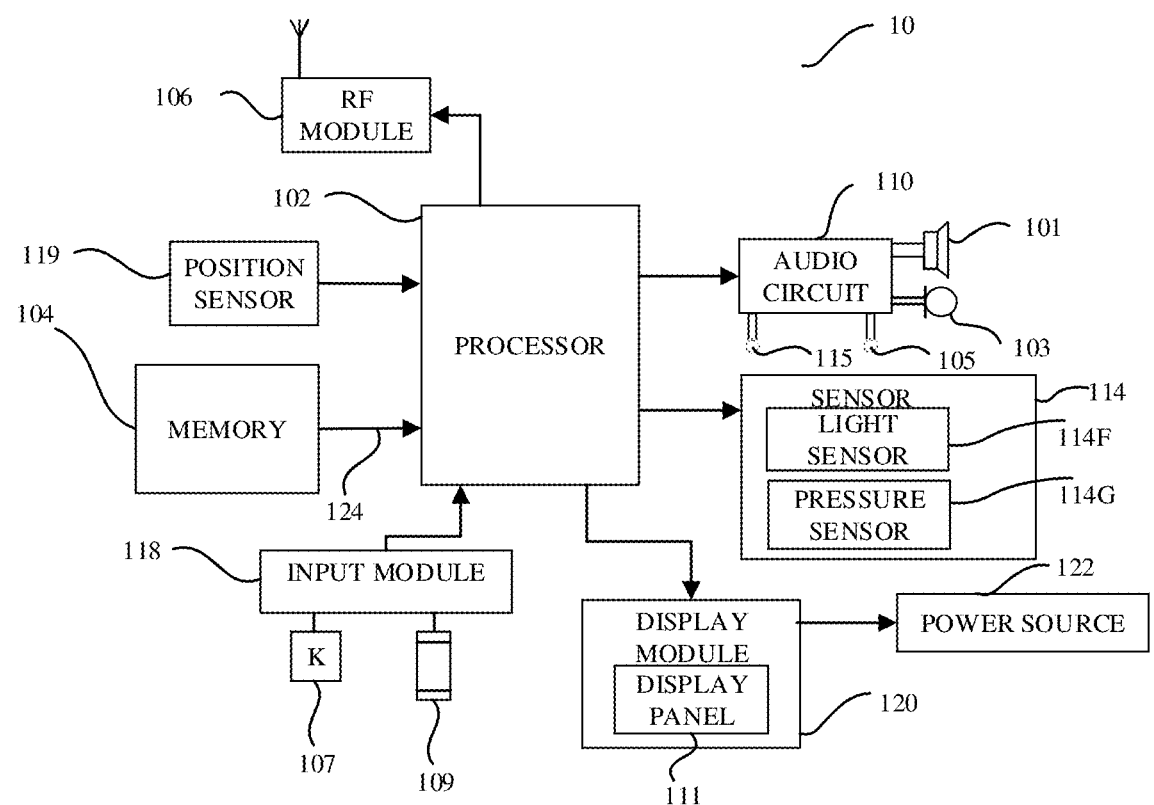
FIG. 12 is a block diagram illustrating a terminal for executing the method for page displaying illustrated in the implementation of the present disclosure.

Referring also to FIG. 12, in an actual application scenario, the terminal 100 may be used as a smart phone. In this case, the electronic body 10 usually further includes one or more processors 102 (only one is illustrated in FIG. 12), a memory 104, a radio frequency (RF) module 106, an audio circuit 110, a sensor 114, an input module 118, and a power supply module 122. A person of ordinary skill in the art may understand that the structure illustrated in FIG. 10 is merely an illustration, which does not limit the structure of the electronic body 12. For example, the electronic body 10 may further include more or fewer components than those illustrated in FIG. 12, or have a configuration different from that illustrated in FIG. 12.

Those of ordinary skill in the art may understand that, with respect to the processor 102, all other components belong to peripherals, and the processor 102 and these peripherals are coupled with each other through multiple peripheral interfaces 124. The peripheral interface 124 may be implemented based on the following standards: Universal Asynchronous Receiver/Transmitter (UART), General Purpose Input Output (GPIO), Serial Peripheral Interface (SPI), and Inter-Integrated Circuit (I2C). However, the present disclosure is not limited to the above standards. In some examples, the peripheral interface 124 may only include a bus. In other examples, the peripheral interface 124 may also include other elements such as one or more controllers, for example, a display controller coupled with the display panel or a storage controller coupled with the memory. In addition, these controllers may also be independent from the peripheral interface 124 and integrated into the processor 102 or corresponding peripherals.

The memory 104 may be used to store software programs and modules. The processor 102 executes various functional applications and data processing by running the software programs and modules stored in the memory 104. The memory 104 may include a high-speed random access memory, and may also include a non-volatile memory, such as one or more magnetic storage devices, a flash memory, or other non-volatile solid-state memory. In some examples, the memory 104 may further include memories remotely set relative to the processor 102, and these remote memories may be coupled with the electronic body 10 or the main display screen 120 through networks. Examples of the above networks include but are not limited to Internet, intranet, local area network, mobile communication network, and combinations thereof.

The RF module 106 is configured to receive and send electromagnetic waves, and realize mutual conversion between electromagnetic waves and electrical signals, so as to communicate with a communication network or other devices. The RF module 106 may include various existing circuit elements for performing these functions, for example, an antenna, a radio frequency transceiver, a digital signal processor, an encryption/decryption chip, a subscriber identity module (SIM) card, a memory, etc. The RF module 106 can communicate with various networks such as Internet, intranet, and wireless networks, or communicate with other devices through the wireless networks. The aforementioned wireless networks may include a cellular telephone network, a wireless local area network, or a metropolitan area network. The above wireless networks can use various communication standards, protocols and technologies, including but not limited to Global System for Mobile Communication (GSM), Enhanced Data GSM Environment (EDGE), broadband code Wideband code division multiple access (W-CDMA), code division multiple access (CDMA), Time Division Multiple Access (TTDMA), Wireless Fidelity (WiFi) such as IEEE 802.10A, IEEE 802.11b, IEEE802.11g, and/or IEEE 802.11n, voice over internet protocol (VoIP), Worldwide Interoperability for Microwave Access (Wi-Max), other protocols used for mail, instant messaging and short messages, and any other suitable communication protocols, even those that have not yet been developed.

An audio circuit 110, an earpiece 101, a sound jack 103, and a microphone 105 cooperatively provide an audio interface between the user and the electronic body 10 or the main display screen 120. For example, the audio circuit 110 receives sound data from the processor 102, converts the sound data into electrical signals, and transmits the electrical signals to the earpiece 101. The earpiece 101 converts the electrical signals into sound waves that can be heard by human. The audio circuit 110 also receives the electrical signals from the microphone 105, converts the electrical signals into sound data, and transmits the sound data to the processor 102 for further processing. Audio data can be obtained from the memory 104 or through the RF module 106. In addition, audio data may also be stored in the memory 104 or transmitted through the RF module 106.

The sensor 114 is disposed in the electronic body 10 or the main display screen 120. Examples of the sensor 114 include but are not limited to a light sensor, a running sensor, a pressure sensor, a gravity acceleration sensor, and other sensors.

The light sensor may include a light sensor 114F and a pressure sensor 114G. The pressure sensor 114G can detect a pressure generated by pressing the terminal 100. That is, the pressure sensor 114G detects the pressure generated by contacting or pressing the terminal, for example, the pressure generated by contacting or pressing the terminal via the user's ear. Therefore, the pressure sensor 114G can be used to determine whether contact or pressing has occurred between the user and the terminal 100, and the magnitude of the pressure.

Referring to FIG. 12 again, in the implementation illustrated in FIG. 12, the light sensor 114F and the pressure sensor 114G are disposed adjacent to the display panel 111. When the light sensor 114F determines that an object approaches the main display screen 120, for example, when the electronic body 10 moves to the ear, the processor 102 disables the display output.

As a type of motion sensor, a gravity acceleration sensor can detect the magnitude of acceleration in various directions (generally three axes), and can detect the magnitude and direction of gravity when at rest, and can be used to identify the posture of the terminal 100 (such as horizontal and vertical screen switch, related games, magnetometer attitude calibration), vibration recognition related functions (such as pedometer, tap), etc. In addition, the electronic body 10 may also be equipped with other sensors such as an angular sensor, a pressure sensor, a moisture sensor, a temperature sensor, and so on, which will not be repeated herein.

In this implementation, the input module 118 may include a touch screen 109 provided on the main display screen 120. The touch screen 109 may collect touch operations on or near the touch screen 109 (such as a user performs an operation on or near the touch screen 109 via any suitable object or accessory such as a finger or a stylus), and drive a corresponding device coupled with the touch screen 109 according to a preset program. Alternatively, the touch screen 109 may include a touch detection device and a touch controller. The touch detection device detects user's touch orientation, detects a signal generated in response to the touch operation, and transmits the signal to the touch controller. The touch controller receives touch information from the touch detection device, converts the touch information into coordinates of touch points, sends the coordinates of the touch points to the processor 102, and then receives and executes commands sent by the processor 102. In addition, various types of resistive, capacitive, infrared, and surface acoustic wave sensors may be used to implement the touch detection function of the touch screen 109. In addition to the touch screen 109, in other modified implementations, the input module 118 may further include other input devices, such as buttons 107. The buttons 107 may include, for example, character buttons for inputting characters and control buttons for triggering control functions. Examples of the control buttons may include a home button, a power on/off button, and so on.

The main display screen 120 is used to display information input by the user, provides information for the user, and provides various graphical user interfaces of the electronic body 10. These graphical user interfaces may be composed of graphics, texts, icons, numbers, videos, or any combination thereof. In one example, the touch screen 109 may be disposed on the display panel 111 to form a whole with the display panel 111.

The power module 122 is used to provide power for the processor 102 and other components. The power module 122 may include a power management system, one or more power sources (such as batteries or alternating current), a charging circuit, a power failure detection circuit, an inverter, a power status indicator, and any other components related to generation, management, and distribution of power of the electronic body 10 or the main display 120.

The terminal 100 further includes a position sensor 119 for determining the actual location where the terminal 100 locates. In this implementation, the position sensor 119 uses a positioning service to implement positioning of the terminal 100. The positioning service should be understood as a technology or service for acquiring location information (such as latitude and longitude coordinates) of the terminal 100 through a specific positioning technology and marking the location of the located object on an electronic map.

It should be understood that the above-mentioned terminal 100 is not limited to a smart phone, and it should be a computer device that can be used while moving. In an implementation, the terminal 100 refers to a mobile computer device equipped with a smart operating system. The terminal 100 includes but is not limited to a smart phone, a smart watch, a tablet computer, and so on.

Figure 13:
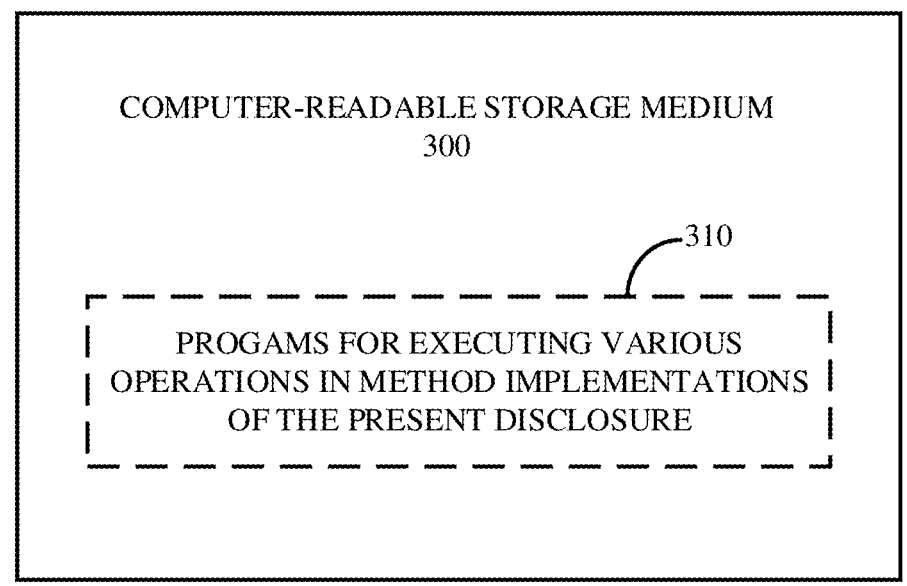
FIG. 13 is a schematic diagram illustrating a storage unit according to an implementation of the present disclosure, the storage unit storing or carrying program codes for realizing the method for page displaying illustrated in the implementation of the present disclosure.

FIG. 13 is a structural block diagram illustrating a computer-readable storage medium according to an implementation of the present disclosure. The computer-readable storage medium 300 stores program codes. The program codes may be called by a processor to execute the method described in the above method implementations.

The computer-readable storage medium 300 may be an electronic memory such as a flash memory, an Electrically Erasable Programmable Read-Only Memory (EEPROM), an electrically Programmable Read-Only Memory (EPROM), a hard disk, or a read-only memory (ROM). Alternatively, the computer-readable storage medium 300 includes a non-transitory computer-readable storage medium. The computer-readable storage medium 300 has a storage space for the program codes 310 that are executed to perform any of the method steps described above. These program codes can be read from or written into one or more computer program products. The program codes 310 may be compressed in an appropriate form, for example.

In this specification, the description referring to the terms "one implementation", "some implementations", "example", "specific example", or "some examples" means that specific features, structures, materials or characteristics described in conjunction with the implementation or example are included in at least one implementation or example of the present disclosure. In this specification, the schematic representation of the above terms does not necessarily refer to the same implementation or example. Moreover, the specific features, structures, materials, or characteristics described may be combined in any suitable manner in any one or more implementations or examples. In addition, without contradicting each other, those skilled in the art may combine and combine different implementations or examples and features of different implementations or examples described in this specification.

In addition, the terms "first" and "second" are used for describing purposes only, and cannot be understood as indicating or implying relative importance or implicitly indicating the number of technical features indicated. Thus, the features defined with "first" and "second" may include at least one feature either explicitly or implicitly indicated. In the description of this disclosure, "plurality" or "multiple" means at least two, such as two, three, etc., unless otherwise specifically limited.

Any process or method description in a flowchart or otherwise described herein may be understood to represent a module, segment, or portion that includes one or more executable instructions for implementing specific logical functions or operations of a process. Additional implementations may fall in the scope of the implementations of the present disclosure, and those skilled in the art shall understand that involved functions may be performed in an order not illustrated or discussed, or in a substantially same manner or in a reverse order.

The logic and/or steps represented in the flowchart or otherwise described herein, for example, a sequenced list of executable instructions for implementing logical functions, can be embodied in any computer-readable medium for being used by or in combination with an instruction execution system, apparatus, or device (such as a computer-based system, a system including a processor, or other systems that can acquire and execute instructions from the instruction execution system, apparatus, or device). For the purposes of this specification, a "computer-readable medium" may be any device that can contain, store, communicate, propagate, or transmit a program for being used by or in combination with the instruction execution system, apparatus, or device. More specific examples of the computer-readable medium (not exhaustively illustrated) include the following: an electrical connection portion (terminal) with one or more wires, a portable computer cartridge (magnetic device), a random access memory (RAM), a ROM, an EPROM or a flash memory, a fiber optic device, and a portable compact disk read-only memory (CDROM). In addition, the computer-readable medium may even be paper or other suitable medium on which the program can be printed, because, for example, by optically scanning the paper or other medium, followed by editing, interpretation, or other appropriate manner if necessary, program can be obtained in an electronic manner, and then be stored in the computer memory.

It should be understood that each part of the present disclosure may be implemented by hardware, software, firmware, or a combination thereof. In the above implementations, multiple steps or methods may be implemented with software or firmware stored in memory and executed by a suitable instruction execution system. For example, if the steps or methods are implemented by hardware, as in another embodiment, the steps or methods can be implemented by any one or a combination of the following techniques known in the art: a discrete logic circuit of a logic gate circuit for implementing a logic function on a data signal, a dedicated integrated circuit with appropriate combinational logic gate circuit, programmable gate arrays (PGA), field programmable gate arrays (FPGA), etc.

A person of ordinary skill in the art can understand that all or part of the steps carried in the method of the above implementations can be completed by instructing relevant hardware through a program. The program may be stored in a computer-readable storage medium. When the program is executed, one of or a combination of the steps of the method implementation is included. In addition, each functional unit in each implementation of the present disclosure may be integrated into one processing module, or each unit may exist alone physically, or two or more units are integrated into one module. The above integrated modules may be implemented in the form of hardware or software function modules. If the integrated module is implemented in the form of a software functional module and sold or used as an independent product, the integrated module may also be stored in a computer-readable storage medium.

The storage medium mentioned above may be a ROM, a magnetic disk or an optical disk. Although the implementations of the present disclosure have been illustrated and described above, it can be understood that the above-mentioned implementations are examples and cannot be construed as limitations to the present disclosure. The implementations may be changed, modified, replaced, and modified within the scope of the present disclosure by those of ordinary skill in the art.

Finally, it should be noted that the above implementations are only used to illustrate the technical solutions of the present disclosure, and not used to limit the present disclosure. Although the present disclosure has been described in detail with reference to the foregoing implementations, those of ordinary skill in the art should understand that the technical solutions described in the foregoing implementations can be modified, or some technical features can be equivalently replaced. These modifications or replacements do not enable the essence of the corresponding technical solutions to deviate from the spirit and scope of the technical solutions of the implementations of the present disclosure.

What is claimed is:

1. A method for user-operation mode selection, the method being applied to a terminal and comprising:
   displaying a user configuration interface, wherein the user configuration interface comprises a first area and a second area, wherein on the first area a plurality of selectable operation modes are displayed, wherein the plurality of selectable operation modes at least comprise a large area pressing;
   receiving a selection operation on the first area;
   determining at least one target operation mode from the plurality of selectable operation modes in response to the selection operation; and
   displaying at least an image-text recognition selecting widget on the second area in response to the large area pressing being determined as the at least one target operation mode, wherein in response to the image-text recognition selecting widget being switched on by default, the large area pressing is able to be used for text and image recognition, and in response to the image-text recognition selecting widget being switched off, the large area pressing is only able to be used for text recognition.

2. The method of claim 1, wherein displaying the user configuration interface comprises:
   displaying the plurality of selectable operation modes on the first area and introduction information associated with the plurality of selectable operation modes on the second area.

3. The method of claim 1, wherein the first area surrounds the second area.

4. The method of claim 1, wherein determining the at least one target operation mode comprises:
   determining, in response to the selection operation, the at least one target operation mode from the plurality of selectable operation modes, wherein a number of the at least one target operation mode equals a preset number.

5. The method of claim 1, wherein information associated with the at least one target operation mode comprises at least one of detailed introduction information of the at least one target operation mode, detailed configuration information of the at least one target operation mode, or authority selection information of the at least one target operation mode.

6. The method of claim 1, wherein the plurality of selectable operation modes further comprise any of: continuous long pressing, two-fingers long pressing, or after copying.

7. The method of claim 1, further comprising:
   when the large area pressing is determined as the at least one target operation mode, displaying a pressing area adjusting widget and a pressing area testing widget on the second area; and receiving a sliding operation on the pressing area adjusting widget, and adjusting an area of an image displayed on the pressing area testing widget in response to the sliding operation, wherein the area of the image is associated with an area of user's pressing on the terminal.

8. The method of claim 7, further comprising:
   after adjusting the area of the image displayed on the pressing area testing widget:
   determining whether the area of the image is smaller than a preset image area; and
   displaying prompt information on the second area in response to determining that the area of the image is smaller than the preset image area.

9. The method of claim 8, further comprising:
   outputting at least one of voice prompt information or vibration prompt information in response to determining that the area of the image is smaller than the preset image area.

10. The method of claim 7, wherein text is displayed on the pressing area testing widget, and the image overlies the text.

11. The method of claim 1, further comprising:
    highlighting the at least one target operation mode among the plurality of selectable operation modes.

12. The method of claim 11, wherein highlighting the at least one target operation mode among the plurality of selectable operation modes comprises at least one of:
    checking the at least one target operation mode among the plurality of selectable operation modes;
    darkening the at least one target operation mode among the plurality of selectable operation modes; or
    hiding operation modes other than the at least one target operation mode among the plurality of selectable operation modes.

13. A terminal comprising:
    a processor; and
    a memory configured to store one or more programs;
    the one or more programs, when executed, being operable with the processor to:
    display a user configuration interface, wherein the user configuration interface comprises a first area and a second area, wherein on the first area a plurality of selectable operation modes are displayed, and wherein the plurality of selectable operation modes at least comprise a large area pressing;
    receive a selection operation on the first area;
    determine at least one target operation mode from the plurality of selectable operation modes in response to the selection operation; and
    display at least an image-text recognition selecting widget on the second area in response to the large area pressing being determined as the at least one target operation mode, wherein in response to the image-text recognition selecting widget being switched on by default, the large area pressing is able to be used for text and image recognition, and in response to the image-text recognition selecting widget being switched off, the large area pressing is only able to be used for text recognition.

14. The terminal of claim 13, wherein the plurality of selectable operation modes further comprise any of: continuous long pressing, two-fingers long pressing, or after copying; and
    wherein the one or more programs to display information associated with the at least one target operation mode on the second area is further operable with the processor to:
    when the large area pressing is determined as the at least one target operation mode, display a pressing area adjusting widget and a pressing area testing widget on the second area, receive a sliding operation on the pressing area adjusting widget, and adjust an area of an image displayed on the pressing area testing widget in response to the sliding operation, wherein the area of the image is associated with an area of user's pressing on the terminal.

15. The terminal of claim 13, wherein the one or more programs operable with the processor to display the user configuration interface is operable with the processor to display the plurality of selectable operation modes on the first area and introduction information associated with the plurality of selectable operation modes on the second area.

16. The terminal of claim 13, wherein information associated with the at least one target operation mode comprises at least one of: detailed introduction information of the at least one target operation mode, detailed configuration information of the at least one target operation mode, or authority selection information of the at least one target operation mode.

17. A terminal comprising:
a processor; and
a memory configured to store one or more programs;
the one or more programs, when executed, being operable with the processor to:
display, in response to user input, a plurality of selectable operation modes on the terminal, wherein the plurality of selectable operation modes at least comprise a large area pressing;
select, in response to an operation on the terminal, at least one of the plurality of selectable operation modes as at least one target operation mode; and
display the large area pressing and at least an image-text recognition selecting widget simultaneously in response to the large area pressing being determined as the at least one target operation mode, wherein in response to the image-text recognition selecting widget being switched on by default, the large area pressing is able to be used for text and image recognition, and in response to the image-text recognition selecting widget being switched off, the large area pressing is only able to be used for text recognition.

* * * * *